US012712600B2

(12) United States Patent
Khaira et al.

(10) Patent No.: US 12,712,600 B2
(45) Date of Patent: Aug. 18, 2026

(54) RECONFIGURABLE THERMALLY ACTUATED TRANSMISSIVE AND REFLECTIVE METASURFACES

(71) Applicant: Dell Products L.P., Round Rock, TX (US)

(72) Inventors: Navjot Kaur Khaira, Kanata (CA); Tejinder Singh, Kanata (CA); Morris Repeta, Ottawa (CA)

(73) Assignee: Dell Products L.P., Round Rock, TX (US)

( * ) Notice: Subject to any disclaimer, the term of this patent is extended or adjusted under 35 U.S.C. 154(b) by 171 days.

(21) Appl. No.: 18/591,436

(22) Filed: Feb. 29, 2024

(65) Prior Publication Data

US 2025/0279807 A1 Sep. 4, 2025

(51) Int. Cl.
*H04B 7/04* (2017.01)
*H01Q 3/46* (2006.01)
*H01Q 15/00* (2006.01)

(52) U.S. Cl.
CPC .......... *H04B 7/04013* (2023.05); *H01Q 3/46* (2013.01); *H01Q 15/0066* (2013.01)

(58) Field of Classification Search
CPC ... H04B 7/04013; H01Q 3/46; H01Q 15/0066
See application file for complete search history.

(56) References Cited

U.S. PATENT DOCUMENTS

| | | | | |
|---|---|---|---|---|
| 9,923,267 | B1 * | 3/2018 | Pala | H01Q 3/01 |
| 2024/0008373 | A1 * | 1/2024 | Huang | H10N 70/253 |
| 2024/0413858 | A1 * | 12/2024 | Mcmenamy | H04W 24/10 |

OTHER PUBLICATIONS

NPL_Liu, "Terahertz metasurfaces exploiting the phase transition of vanadium dioxide" (Year: 2023).*
NPL_Matos, "VO2-based ultra-reconfigurable intelligent reflective surface for 5G applications" (Year: 2022).*
NPL_San, "Equivalent circuit for VO2 phase change material film in reconfigurable frequency selective surfaces" (Year: 2015).*
NPL_San2, "Reconfigurable THz Filters Using Phase-Change Material and Integrated Heater" (Year: 2016).*
NPL_Liaskos, "Using any surface to realize a new paradigm for wireless communications" (Year: 2018).*

(Continued)

*Primary Examiner* — Dimary S Lopez Cruz
*Assistant Examiner* — Anna N Hamadyk
(74) *Attorney, Agent, or Firm* — Workman Nydegger

(57) ABSTRACT

A reconfigurable thermally actuated transmissive and reflective panel or surface is disclosed. A panel includes a metallization layer that includes unit cells configured to resonate at a desired frequency or range of frequencies. The panel includes a switch layer formed of a metal insulator transition material that is thermally controlled with a refractory heater layer to be in a metallic state or an insulator state. The state determines whether the panel operates in a reflective mode in which incident signals are reflected or a transmission mode in which incident signals are transmitted through the panel. The refractory heater layer, when provided with a voltage, generates heat to heat the switch layer and switch to the metallic state. Removing (or lowering) the voltage allows the temperature of the switch layer to drop until the switch layer transitions to the insulation state and the panel operates in the transmission mode.

13 Claims, 11 Drawing Sheets

(56) References Cited

OTHER PUBLICATIONS

Choudhury, "5G wireless and millimeter wave technology evolution: An overview", Intel IEEE 2015.
Rappaport, et al, "Mobile's millimeter-wave makeover," in IEEE Spectrum, vol. 51, No. 9, pp. 35-58, Sep. 2014.
Subrt, et al, "Controlling Propagation Environments Using Intelligent Walls," in 6th European Conference on Antennas and Propagation (EUCAP), (downloaded Nov. 18, 2024 from IEEE).
Kaina, et al, "Shaping complex microwave fields in reverberating media with binary tunable metasurfaces," Scientific Reports, vol. 4, pp. 1-7, published online Oct. 21, 2024, updated Jan. 22, 2015.
Dai, et al, "Reconfigurable Intelligent Surface-Based Wireless Communications: Antenna Design, Prototyping, and Experimental Results," arXiv:1912.03620v1, Dec. 8, 2019.
Huang, et al., "Reconfigurable metasurface for multifunctional control of electromagnetic waves", Advanced Optical Materials, vol. 5, No. 22, 2017.
Baladi, et al, "Dual-Band Circularly Polarized Fully Reconfigurable Reflectarray Antenna for Satellite Applications in the Ku-Band", IEEE Transactions of Antennas and Propagation, Dec. 2021.
Schmitt, et al, "Design and Fabrication of MEMS Reflectors for THz Reflect-Arrays," Fourth International Workshop on Mobile Terahertz Systems (IWMTS), pp. 1-5, Germany 2021.
Kim, et al, "Independently Polarization Manipulable Liquid-Crystal-Based Reflective Metasurface for 5G Reflectarray and Reconfigurable Intelligent Surface," IEEE Transactions on Antennas and Propagation, pp. 6606-6616, Jun. 2023.
Dash, et al, "Active Control of THz Waves in Wireless Environments Using Graphene-Based RIS," in IEEE Transactions on Antennas and Propagation, vol. 70, No. 10, pp. 8785-8797, Oct. 2022.

* cited by examiner

RECONFIGURABLE THERMALLY ACTUATED TRANSMISSIVE AND REFLECTIVE METASURFACES

FIELD OF THE INVENTION

Embodiments of the present invention generally relate to reconfigurable intelligent surfaces. More particularly, at least some embodiments of the invention relate to systems, hardware, software, computer-readable media, and methods for reconfigurable surfaces for reflecting and/or transmitting incident signals.

BACKGROUND

Cellular wireless communication is primarily based on 5G technology, which is generally intended to deliver Gigabit data speeds, low latencies, and a better user experience. These goals have been largely achieved. The telecom industry and others, however, are working to deliver sixth generation (6G) wireless communications and networks.

Advancing to 6G wireless communication will have rigorous requirements, including extraordinarily high spectrum and energy efficiency, microsecond latency, and full-dimensional network coverage. Current communication technologies, such as ultra-massive multiple-input multiple-output (UM-MIMO) and ultra-dense networks (UDNs), are being expanded to meet these objectives.

However, these enhancements are not without their challenges. The escalation in the quantity of antennas/base stations and usage of high carrier frequencies can potentially lead to increased energy consumption and hardware costs due to the need for more power-hungry and costly radio frequency (RF) chains. Additionally, the introduction of numerous active components operating at high frequencies can create complex interference scenarios, pilot contamination, and significant hardware impairments.

To counter these issues, the development of cost-effective strategies for wireless communication systems is imperative and reconfigurable intelligent surfaces (RISs) are being viewed as potential solutions. Conventional reconfigurable intelligent surfaces primarily focus on surfaces that reflect incident signals. Purely reflective reconfigurable intelligent surfaces primarily function as passive relay nodes that adjust the direction of incident wireless signals, thereby improving the performance of wireless communication. However, both the source of a signal and the target of the signal need to be on the same side of the reconfigurable intelligent surface, which limits the flexibility of the reconfigurable intelligent surface. This constraint reduces the flexibility of deploying these surfaces in various real-world scenarios where the transmitter and receiver may not be located on the same side of the reconfigurable intelligent surfaces.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to reconfigurable intelligent surfaces. More particularly, at least some embodiments of the invention relate to systems, hardware, software, computer-readable media, and methods for selectively reflecting or transmitting a signal incident on the reconfigurable intelligent surface.

Embodiments of the invention further relate to a reconfigurable intelligent surface that is capable of both transmitting and reflecting wireless signals. Reconfigurable intelligent surfaces in accordance with embodiments of the invention can operate as a relay node or transmission node that transmits signals to the other side of the reconfigurable intelligent surface or as a reflection node that reflects signals or electromagnetic radiation. This provides greater flexibility in deploying reconfigurable intelligent surfaces and in expanding their potential applications.

In one example, a reconfigurable intelligent surface is an engineered two-dimensional surface that may include passive elements or unit cells and may include metamaterials. A panel that includes a grid or arrangement of unit cells is an example of a reconfigurable intelligent surface. A reconfigurable intelligent surface functions by manipulating a phase response of each unit cell. This adjusts or configures the propagation of incident wireless signals and enables smart radio environments (SREs).

Embodiments of the invention more specifically relate to a reconfigurable intelligent surface that is capable of either reflecting or transmitting wireless signals (electromagnetic waves). Reconfigurable intelligent surfaces can dynamically switch between a transmission mode and a reflection mode, thereby providing reconfigurable 360° environment coverage. When operating in the reflection mode, the reconfigurable intelligent surface behaves like an RF (Radio Frequency) mirror that reflects the incoming beam back on the same side. When operating in a transmission mode, the reconfigurable intelligent surface operates as a lens, projecting the incoming beam with high directivity on the other side. A reconfigurable intelligent surface can be deployed or installed on surfaces such as windows (walls or other locations) where the radio coverage can be selectively enhanced on both sides of the surface or window. A series of reconfigurable intelligent surfaces can be deployed and arranged to reflect a signal to a particular area. This allows obstacles that may degrade or interfere with a signal in the environment, whether indoor or outdoor, to be avoided.

Figure 1:
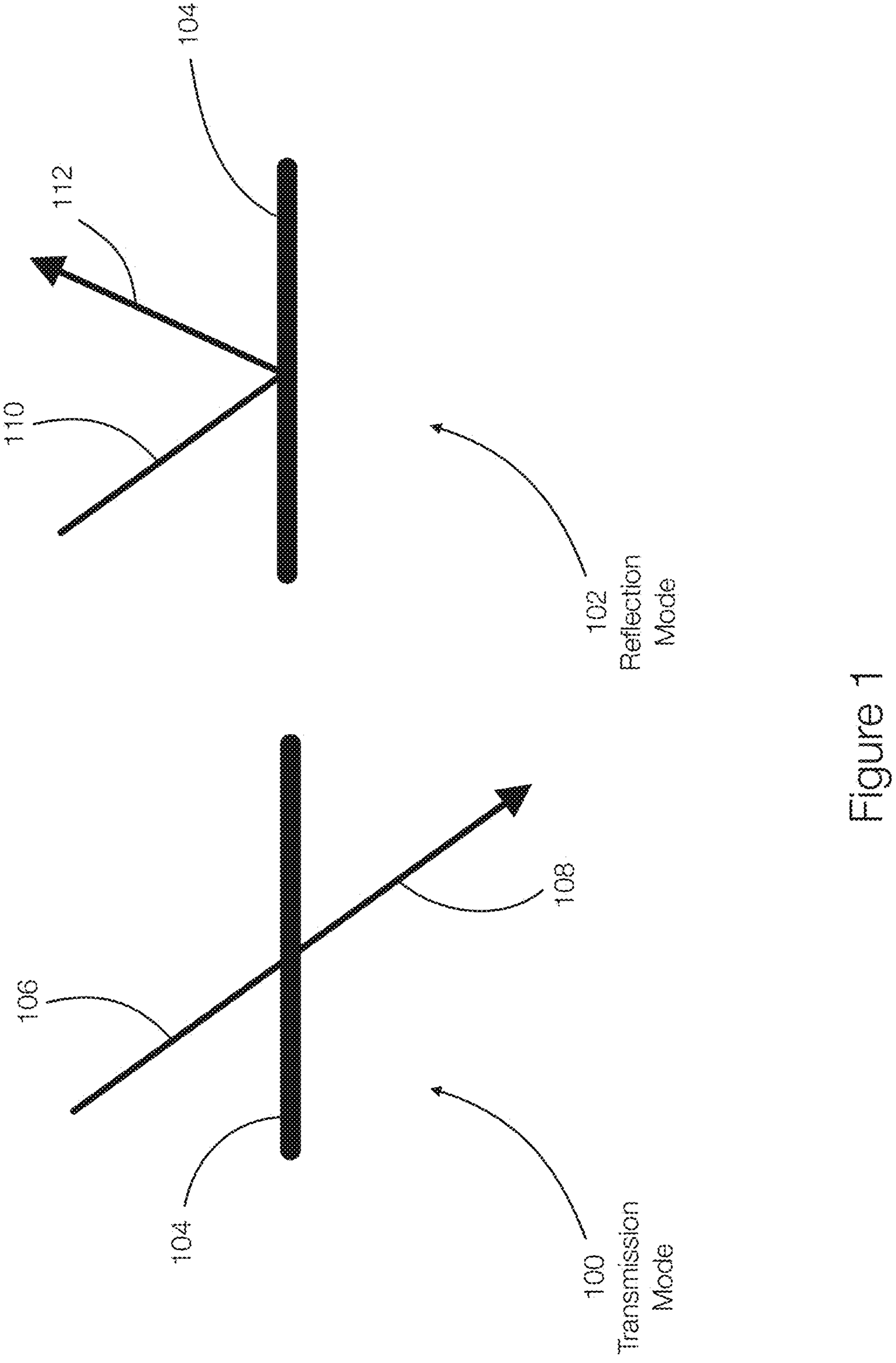
FIG. 1 discloses aspects of a reconfigurable intelligent surface or panel.

FIG. 1 discloses aspects of a reconfigurable intelligent surface. FIG. 1 illustrates a reconfigurable intelligent surface 104 (or panel) that is configured to operate in a transmission mode 100 or a reflection mode 102. In the transmission mode 102, an incident signal 106 is transmitted through and by the reconfigurable intelligent surface 104 as the signal 108. Embodiments of the invention can control the direction of transmission by configuring the unit cells. In the reflection mode 102, the incident signal 110 is reflected as the signal 112 by the reconfigurable intelligent surface 104. The reflection direction of the reflected signal can also be controlled by configuring the unit cells. Because reconfigurable intelligent surfaces do not require radio frequency (RF) chains, they present a more economical and environmentally friendly alternative to traditional multi-antenna and relaying technologies.

Embodiments of the invention relate to a reconfigurable intelligent surface that includes a switch layer. Controlling the switch layer allows the reconfigurable intelligent surface to switch from the transmission mode to the reflection mode and from the reflection mode to the transmission mode.

Generally, the switch layer includes a material (e.g., a metal insulator transition material or similar materials which can change their metallic properties with external stimuli) configured to transition from a metallic state to an insulator state and from the insulator state to the metallic state. Embodiments of the invention are discussed with respect to vanadium dioxide ($VO_2$) as the switch layer. However, embodiments of the invention include other materials that have similar characteristics. These materials include $VO_2$ and other vanadium compounds, but are not limited thereto. The transition may occur based on the temperature of the material. The temperature of the switch layer may be changed using electric energy. For example, a voltage may be applied to a strip of material that generates heat (e.g., based on its resistance). The heat generated in this manner is delivered to the switch layer to induce the desired transition.

In one example, the switch layer includes a layer of vanadium dioxide ($VO_2$). This material, $VO_2$, undergoes a phase change from a metallic state to an insulator state depending on a temperature of the material. The switch layer can be heated using, in one example using a heat source that is heated by applying a voltage. By controlling the voltage applied to the heat source (e.g., on or off), the reconfigurable intelligent surface can dynamically switch between a transmission mode (when $VO_2$ is in insulator state) and a reflection mode (when $VO_2$ is in metallic state) in real-time or near real time.

In the transmission mode, functionally comparable to an optical lens, the reconfigurable intelligent surface modifies the phase shift of different lens portions when transmitting, thereby collimating an incident wave. In the reflection mode, the reflected signal from each element/unit cell is offered a certain phase shift such that a constructive interference leads the reflected beam at the desired angle to the incoming beam.

To allow for arbitrary phases on the aperture, a minimum phase range of 360° can be provided by each unit cell. The change in reflection phase from each unit cell is achieved by making dimensional changes to the unit cell geometry. In one example, the unit cells are arranged on the reconfigurable intelligent surface panel according to the desired phase profile such that a constructive reflected signal gain is achieved in the desired direction. Embodiments of the invention offer desirable characteristics such as a broad bandwidth, low reflection loss, low insertion loss, and a compact physical profile. In a passive panel, the reflection phase of each unit cell may be determined in advance.

Figure 2:
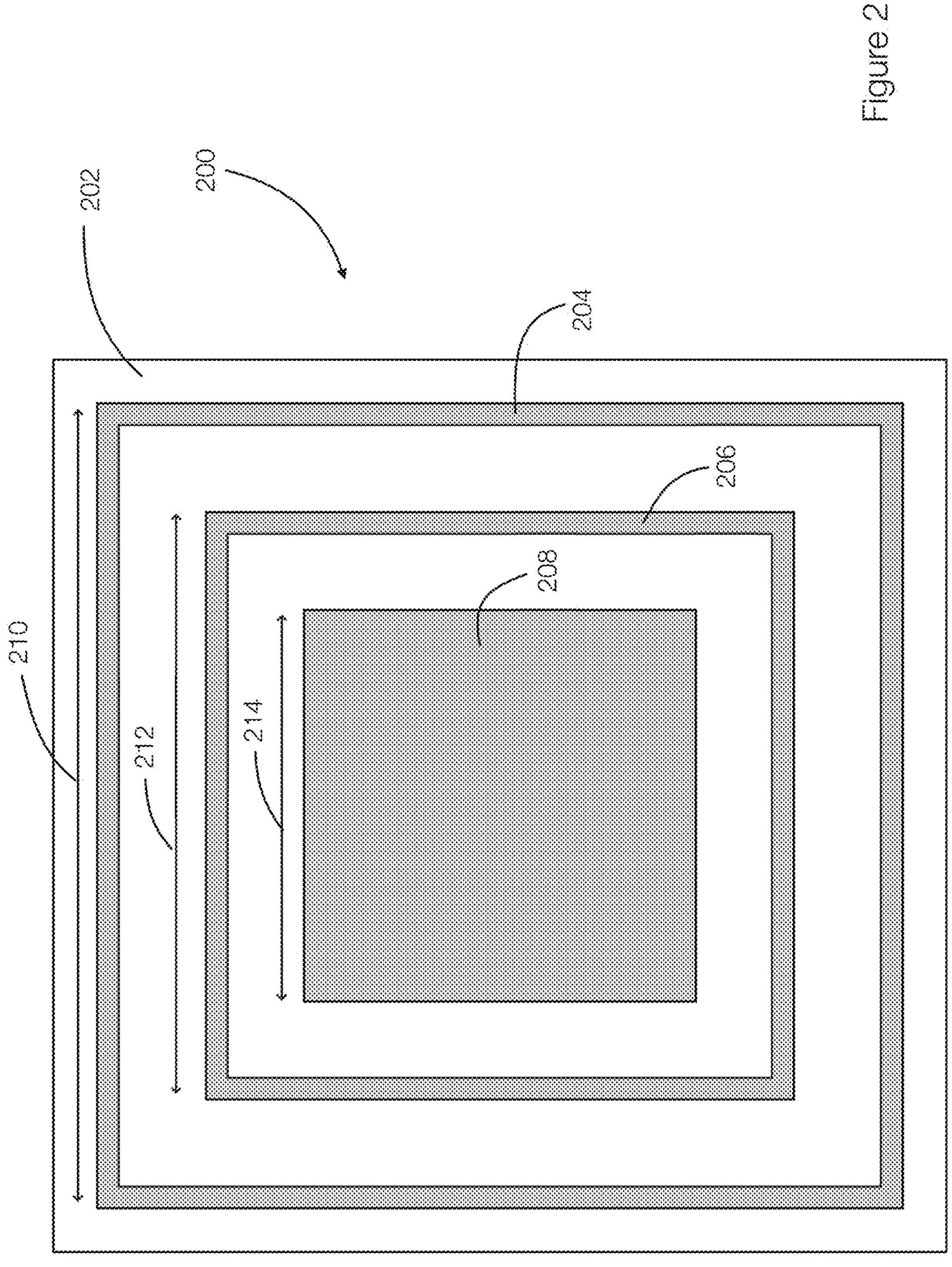
FIG. 2 discloses aspects of a unit cell included in a metallization layer of a panel.

FIG. 2 discloses aspects of a metallic or unit cell that may be included in a reconfigurable intelligent surface. FIG. 2 illustrates an example metal pattern (204, 206, 208) of a unit cell 200 formed on a surface or substrate 202. The pattern includes, by way of example only, a center portion 208 that is enclosed by a concentric rings 206 and 204. In this example, the center portion 208 has a square shape. The concentric rings 206 and 204 also have a square shape in this example. The center portion 208 and the concentric rings 206 and 204 are generally referred to as rings or a ring pattern. The configuration of the metal pattern of each unit cell may include any shape/number of discrete components as long as the pattern 204, 206, 208 is resonant at a desired frequency (or range of frequencies) of operation in one example. Thus, the metal pattern may include a concentric configuration, a solid shape (e.g., a cross or X shape) or the like.

The example unit cell 200 of FIG. 2 describes a particular pattern and illustrates how the pattern may be varied. This example is presented by way of example and not limitation. In one example, the dimensions 210 of the outer ring 204 ($S_3$ by $S_3$) and the dimensions 214 of the center portion 208 ($S_1$ by $S_1$) are constant. The dimensions 212 of the inner or middle ring 206 ($S_2$ by $S_2$) in the unit cells of a panel may vary in different embodiments or in the same embodiment. Other embodiments allow for the dimensions of the center portion 208 and the rings 206 and 204 to be varied as well. More generally by way of example only, the dimensions conform to the following condition: $S_1 \leq S_2 \leq S_3$, for any given embodiment. In addition, the thickness 212 of the rings 204 and 206 may also vary and may be the same or different.

Generally, the center portion 208 and the rings 206 and 204 are configured (e.g., sized, shaped, and positioned) to be resonant with a particular frequency or a range of frequencies. By way of example and not limitation, embodiments of the invention relate to the transmission and reflection of signals (electromagnetic radiation) in the range of 30 GigaHertz to 300 GigaHertz. In one example, the designs/patterns of the unit cells may be frequency independent and may depend on the size of the unit cell and the spacing between the unit cells. Thus, the design of the unit cell or of the reconfigurable intelligent surface can be scaled to operate at lower frequencies or at higher frequencies including TeraHertz frequencies.

Figure 3:
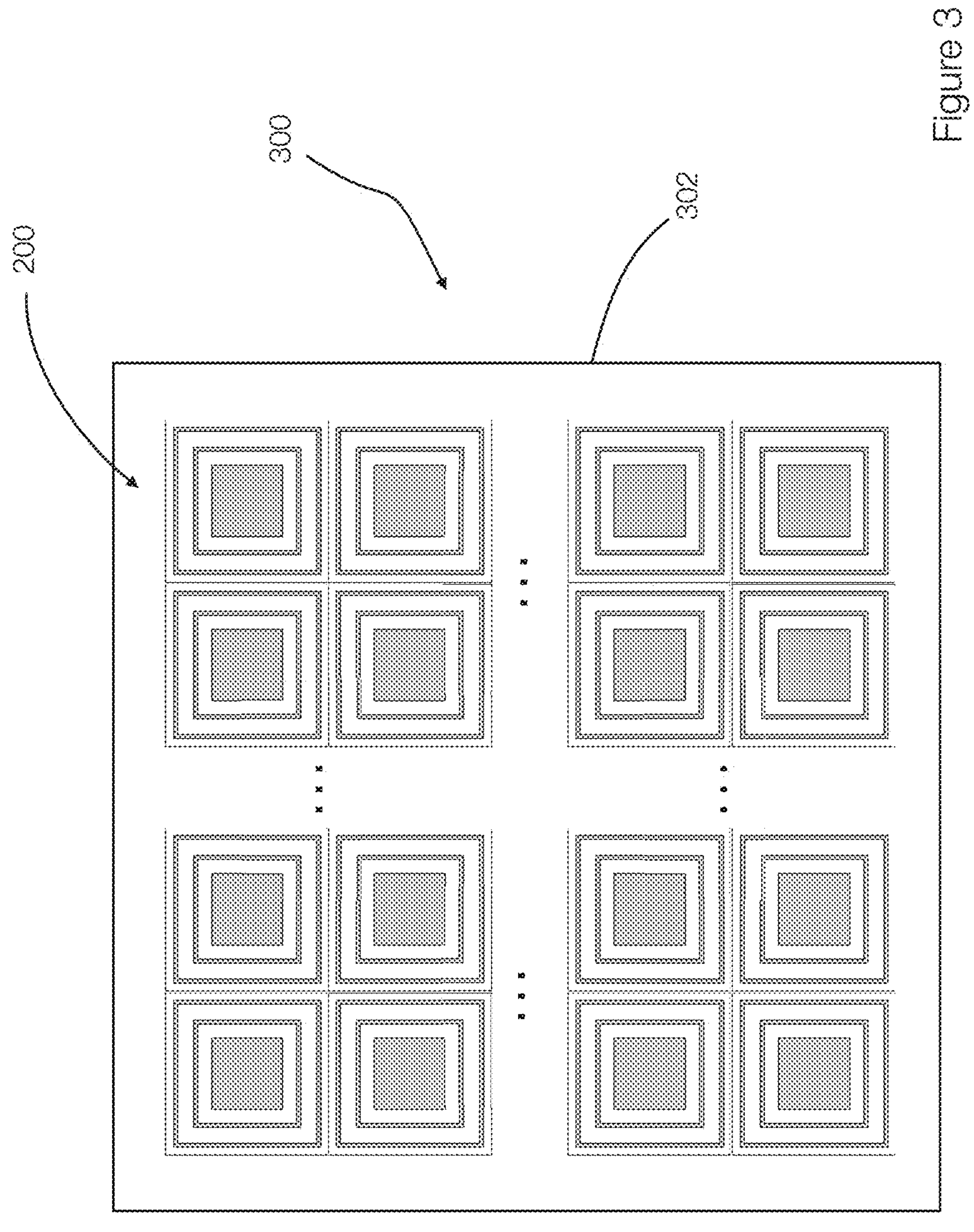
FIG. 3 discloses additional aspects of a panel that includes a plurality of unit cells.

FIG. 3 discloses aspects of a reconfigurable intelligent surface. FIG. 3 illustrates a reconfigurable intelligent surface or panel 300. The panel 300 includes a plurality of unit cells 200 formed on a substrate 302 or panel body. In this examples, each of the unit cells has the same configuration or metallic pattern. However, the configurations may vary based on the desired reflection direction or for other reasons. The metallic patterns of the unit cells 200 are not connected (e.g. electrically) to each other in one example. The overall dimensions of the panel 300 may depend on or be determined based on the desired operational frequency. The desired operational frequency, for example, may be reflected in the dimensions of the unit cells 200.

The metallic pattern of the unit cells 200 may be formed on or printed on the substrate 302, which may be transparent (e.g., to the relevant radio frequencies). The angle of the reflected signal or beam is determined by a phase profile of the unit cells 200. In one example, the reflection phase of each unit cell is selected to ensure that the beam is amplified or reflected in the intended direction.

The panel 300 may be an active panel or a passive panel. In an active panel, the unit cells 200 of the panel 300 are configured to adjust a phase shift of the incoming signal, which, when managed collectively across the entire surface, can steer the signal in a specific direction or focus the reflected signal towards a particular point. This phase control may be performed using various mechanisms like PIN diodes, varactor diodes, or Micro-Electro-Mechanical Systems (MEMS) based capacitors. These mechanisms allow signal reflection in the same half space as the incoming signal. Alternatively, the panel 300 may be static and be configured in advance, (e.g., in the design of the metallic patterns of the unit cells) to reflect in a particular or specific direction.

Embodiments of the invention further relate to a panel configured to reflect and/or transmit incident signals. To achieve the flexibility of either signal reflection or transmission, the panel 300 may include a Vanadium Dioxide ($VO_2$) layer (a switching layer) to switch between reflection and transmission modes through thermal regulation. As a material that exhibits a metal-insulator transition, $VO_2$ can transition from a metallic to an insulating state and vice versa under the influence of heat. Consequently, the temperature of the $VO_2$ layer can be manipulated to switch dynamically between transmission mode (when $VO_2$ is in an insulating state) and reflection mode (when $VO_2$ is in a metallic state), all in real time.

More specifically, $VO_2$ undergoes a temperature-driven phase shift at about 67° C. When the temperature falls below this threshold, $VO_2$ behaves as an insulator. Conversely, when the temperature exceeds this point, $VO_2$ transitions into a metallic state. Each unit or element of the panel is designed to provide a full 360° phase shift through dimensional modifications. The reflection phase of each unit cell is determined by the intended direction of the panel's reflected beam.

The panel 300 may include a heating layer such that the switch layer can be heated. Tungsten (W), an example of a refractory material, may be used as a heating layer and may be configured as a meandered heater due to its high melting point, resistance to thermal stress and chemical erosion, stability under high pressure and low thermal conductivity.

In transmission mode, the panel 300 mimics a lens, guiding the incoming beam with remarkable precision to the opposite side. When in reflection mode, the panel 300 functions as an RF mirror, directing the incoming beam with high directivity back to the same side.

Figure 4A:
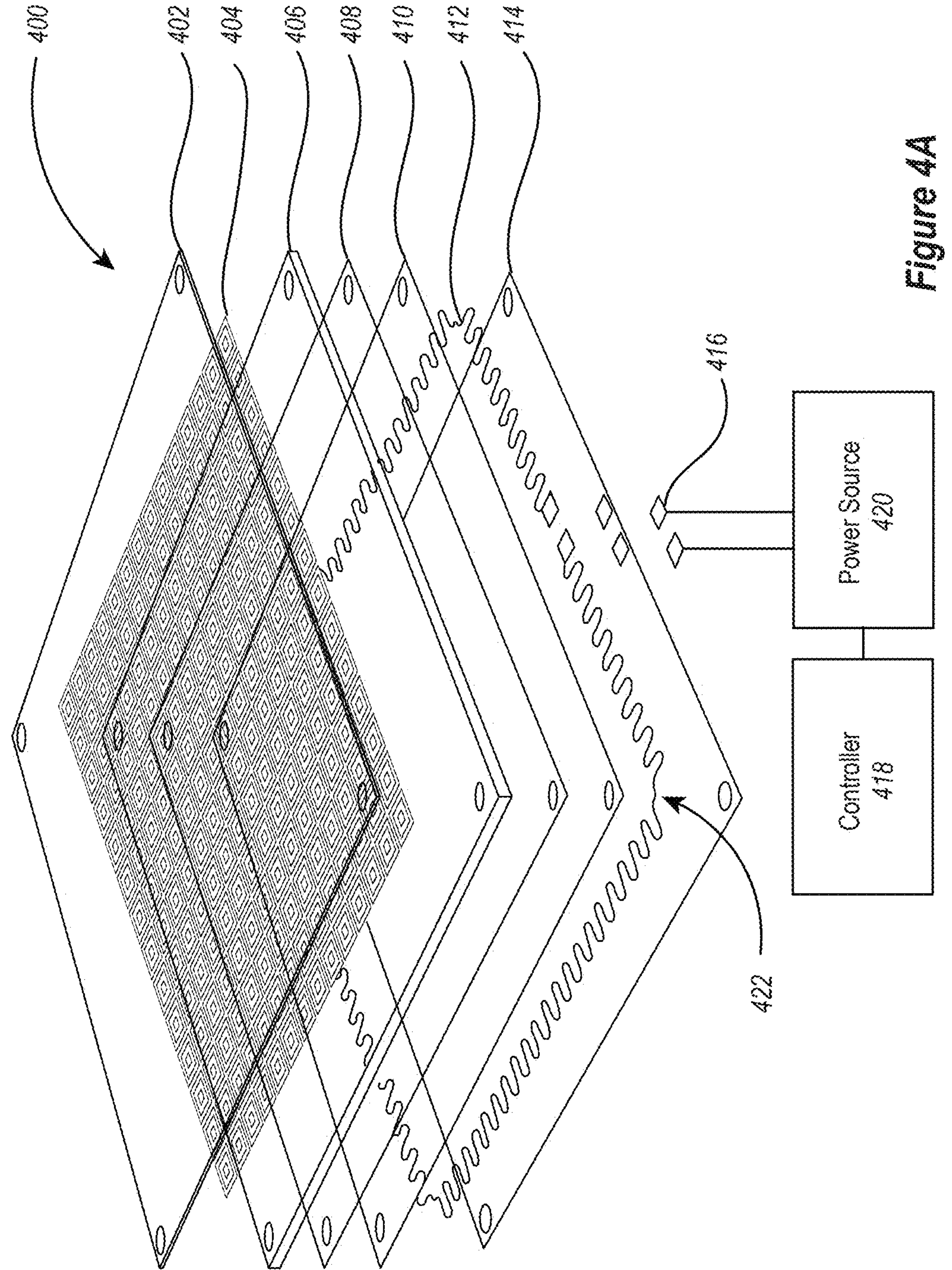
FIG. 4A discloses aspects of a panel that is thermally controlled to operate in reflective and transmission modes.

FIG. 4A illustrates an example of a panel configured for to operation in reflective and transmissive modes. FIG. 4A more specifically illustrates example layers of an example panel 400. The panel includes a metallization layer 404 that includes metallic patterns that are formed or printed on a substrate 406. These metallic patterns in the metallization layer 404 form the unit cells of the panel 400. The reflection phase of each unit cell is configured to ensure that the unit cells collectively amplify the beam or reflected signal in an intended direction.

In one example, the substrate 406 is silicon or FR4. Other substrates include, but are not limited to, glass, sapphire, quartz, rogers RF or the like. In one example, the substrate includes a dielectric material.

The cover layer 402, which may be a dielectric, is formed over the metallic pattern to protect the metallization layer 404. A metal insulator transition layer 408 is formed on a surface of the substrate 408. The metallization layer 404 and the metal insulator transition layer 408 are on opposite sides of the substrate 406. The metal insulator transition layer 408 is an example of a switch layer and may be formed, by way of example, of $VO_2$.

An insulator layer 410 is formed under the metal insulator transition layer 408, The insulator layer 410 separates the metal insulator transition layer 408 from a refractory heater 412 or heating layer. The bottom layer 414, which may be a dielectric, may be configured to protect the refractory heater 412. Contact pins 416 may be provided that extend through the bottom layer 414 and connect to the refractory heater 412. When a voltage is applied across the contact points 416, a current flows in the refractory heater 412 and heat is generated.

In one example, the insulator layer 410 is thermally conductive such that the heat generated by the refractory heater 412 is received by the metal insulator transition layer 408. When the appropriate temperature is reached, the metal insulator transition layer 408 transitions and the operating mode of the panel 400 changes. When the voltage is removed from the contact points 416, heat is no longer generated by the refractory heater 412 and the metal insulator transition layer 408 cools below the transition temperature and the panel 400 switches back to the other mode.

In one example, the refractory heater 412 has a meandering shape, although other shapes including straight portions are possible. This helps ensure/control the amount of heat generated. The shape of the refractory heater 412 may be periodic repetitive, sinusoidal, or other repeating shape. The dimensions (e.g., width and thickness) of the refractory heater 412 may change and may or may not be constant. Further, sharp points in the meandering shape are avoided or not included in the shape of the refractory heater 412 to avoid heat gradients. Due to the shape of the panel, the meandering shape may have transition shapes (e.g., transition shape 422) that allows the meandering shape to switch to a different orientation. The refractory heater 412 may have any shape, thickness, and/or width.

As is illustrated in FIG. 4A, the refractory heater 412 includes four sides and four transitions 422. The sides each have the same shape in this example. Ends of the meandering shape of the refractory heater 412 terminate at the contact points 416. The specific shape can be selected based on heat requirements, transition time requirements, or the like. The specific shape may depend on panel shape. For example, a hexagon shaped panel may have a refractory heater with 6 sides.

Figure 4B:
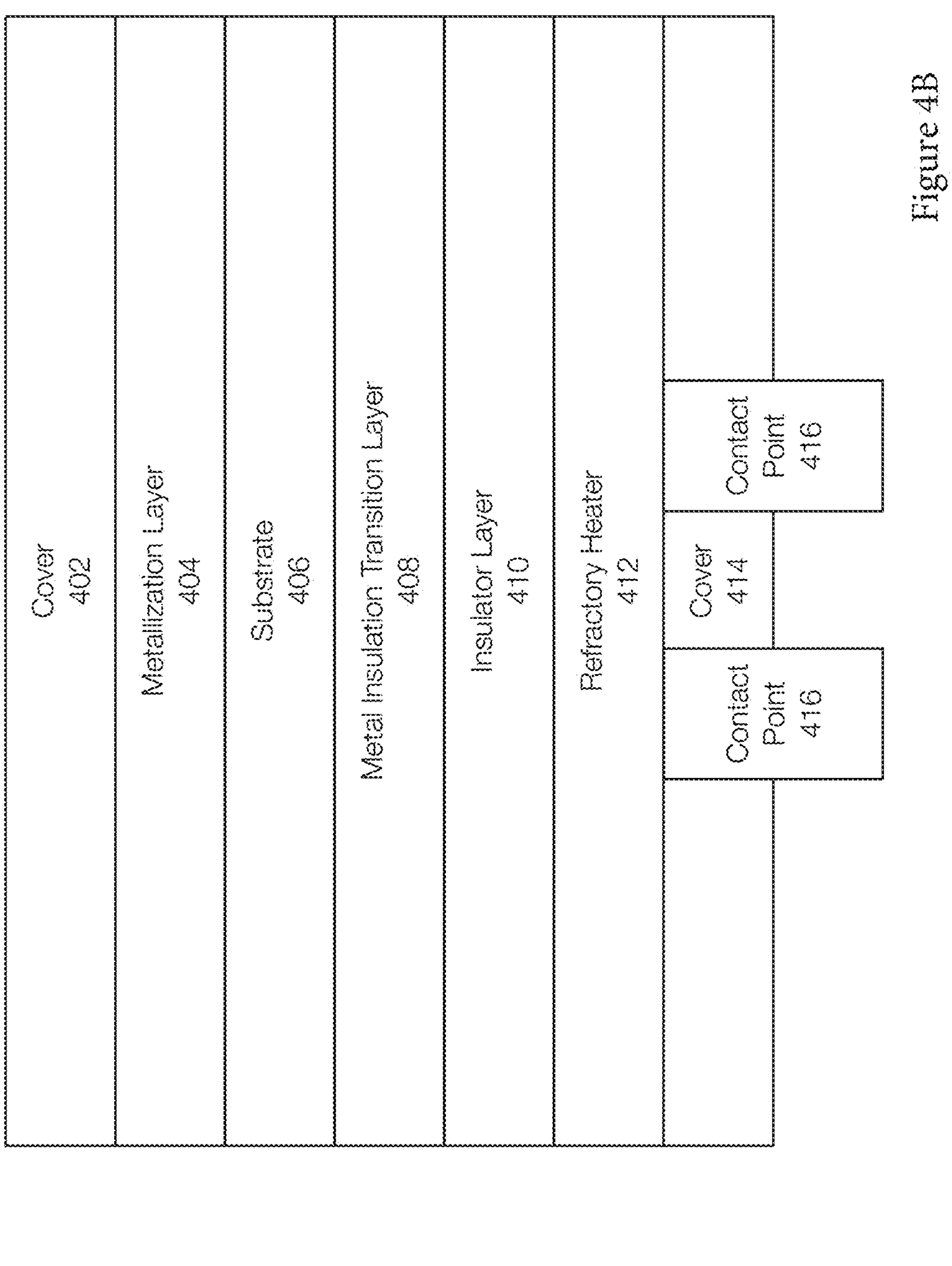
FIG. 4B discloses additional aspects of the panel in FIG. 4A.

The refractory heater 412 may also be transparent to radio frequencies (e.g., operational frequencies of the panel 400). The refractory heater 412 may be disposed on a perimeter of the layer (e.g., a perimeter of the unit cells) or may overlap partially or completely with the unit cells in the metallization layer 404. In this example, the refractory heater 412 and the unit cells do not overlap in the depth direction 430 (FIG. 4B). Thus, all of the unit cells are inside a perimeter of the refractory heater 412.

The panel 400 may include or be connected to a controller 418 and/or a power source 420. The controller 418 may be controlled over a wireless network and determine when a voltage is applied to the contact points 416. Thus, the controller 418 may be configured to control when the panel 400 operates in a transmissive mode and when the panel 400 operates in a reflective mode. The controller 418 may determine when a voltage is applied/removed from the contact points 416, thereby controlling the temperature of the switch layer 408 and the operating mode of the panel 400

FIG. 4B illustrates a cross-sectional view of the panel 400 that is taken through the contact points. As illustrated, a refractory heater 412 is formed on a cover 414. The insulator layer 410 is formed over the refractory heater 412 and the metal insulation transition layer is formed over the insulator layer 410. Thus, the insulator layer 410 separates the refractory heater 412 from the metal insulation transition layer 408. As previously stated, the insulation layer 410 is thermally conductive but not electrically conductive in one embodiment. This may prevent an electrical connection between the refractory heater 412 and the metal insulation transition layer 408.

The substrate 406 is formed over the metal insulation layer 408 and the metallization layer 404 is formed on the substrate 406. A cover 402 is formed to protect the metallization layer 404. The contact points 416 allow an electrical connection (e.g., a voltage or current) to be applied to the refractor heater 412.

Different conductive metals like copper, aluminum, or gold can be used for the metallization layer 404. The $VO_2$ material (or other metal insulation transition material) used to form the metal insulation transition layer 408 has a transition phase that leads changes in its electrical and optical properties. At temperatures below 67° C., $VO_2$ is in its monoclinic (insulating) phase. As the temperature rises above 67° C., $VO_2$ undergoes a first-order phase transition to its rutile (metallic) phase. This transition leads to a change in resistivity by several orders of magnitude, from an insulator to a conductor.

Figure 5:
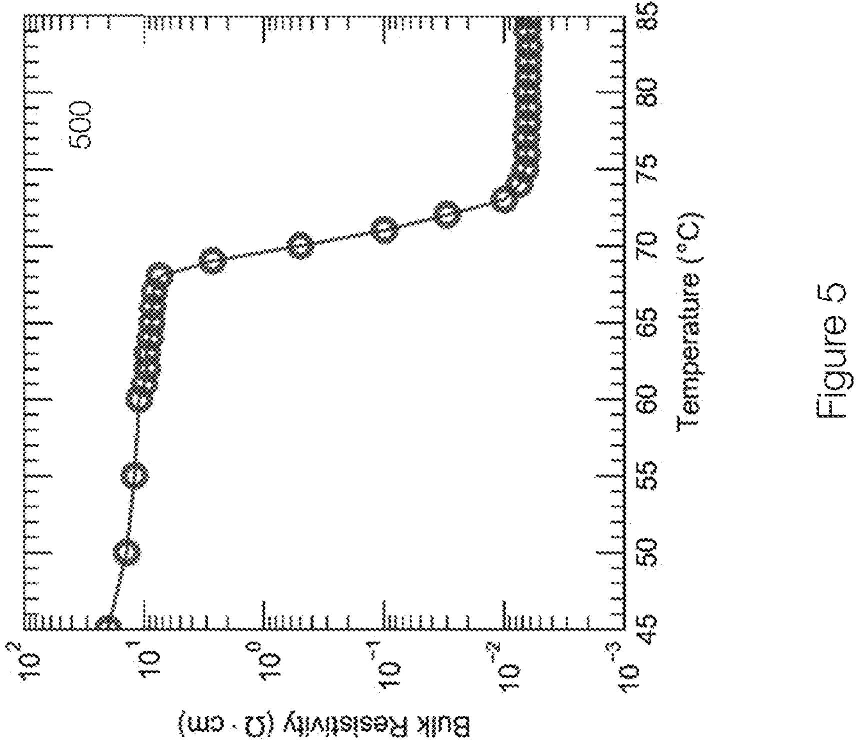
FIG. 5 illustrates a change in resistivity for an example metal insulation transition material.

FIG. 5 illustrates a change in resistivity for a metal insulation transition material such as $VO_2$. In the graph 500, the resistivity of the metal insulation transition material drops substantially at certain temperatures. Controlling the temperature of the metal insulation transition layer 408 thus allows the operating mode (reflective/transmissive) of the panel 400 to be controlled by, in effect, changing the resistivity of the $VO_2$.

More specifically in one example, the phase transition of $VO_2$ is accompanied with a hysteresis. Thus, the transition temperature when heating may be different from the transition temperature when cooling. The hysteresis of the metal insulation transition material may be considered in configuring the refractory heater 412.

In one example, tungsten (W) is selected as the refractory heater 412 due to its high melting point of 3422° C. Tungsten is a metal with a high melting point, which makes tungsten useful for applications that involve extreme heat, such as in the electronics, aerospace, and military industries. Tungsten also has good electrical conductivity and a low coefficient of thermal expansion, making it even useful for high-temperature applications.

Figure 6B:
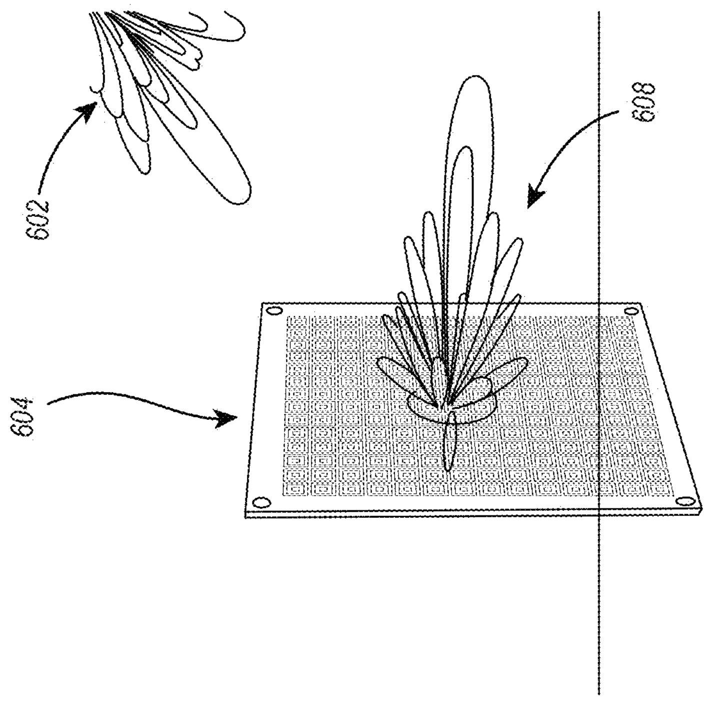
FIG. 6B discloses aspects of a panel operating in a reflection or reflective mode.
Figure 6A:
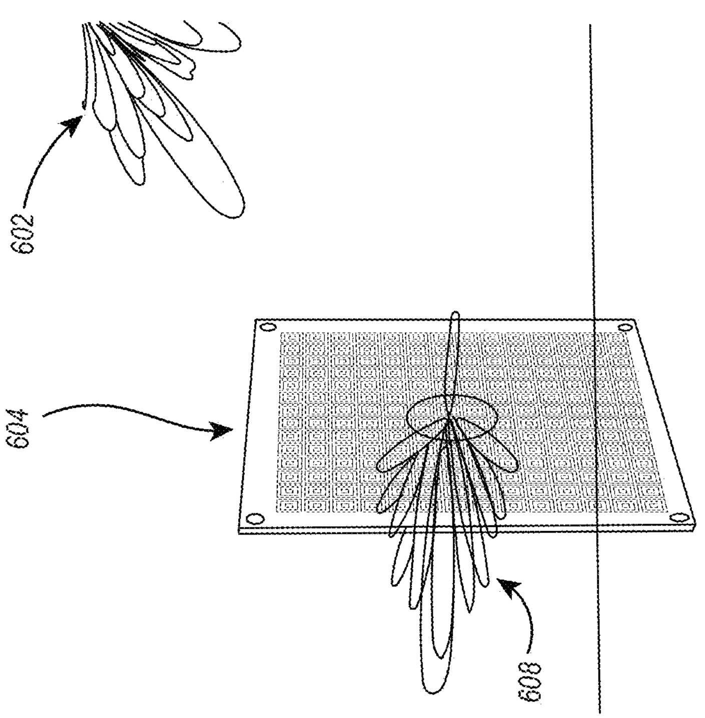
FIG. 6A discloses aspects of a panel operating in a transmission or transmissive mode.

FIG. 6A discloses aspects of a panel operating in a transmissive mode. In the transmissive mode, an incident signal 602 is received by a panel 602 (e.g., the panel 400) and is transmitted as a transmitted signal 606. The panel 600, in this example is similar to an optical lens. The panel 600 alters the phase shift across various unit cells during transmission, which allows for the collimation of an incoming wave or signal 602.

FIG. 6B discloses aspects of a panel operating in a reflective or reflection mode. In the reflection mode, the metal insulator transition layer is controlled to be in a metallic state such that the incident signal 602 is reflected by the panel 604 as a reflected signal 608 or reflected beam. In this example, the signal reflected from each unit cell is given a specific phase shift, ensuring constructive interference that steers the reflected beam or signal 608 to the desired angle relative to the incoming signal 602 in one example.

Figures 7A, 7B:
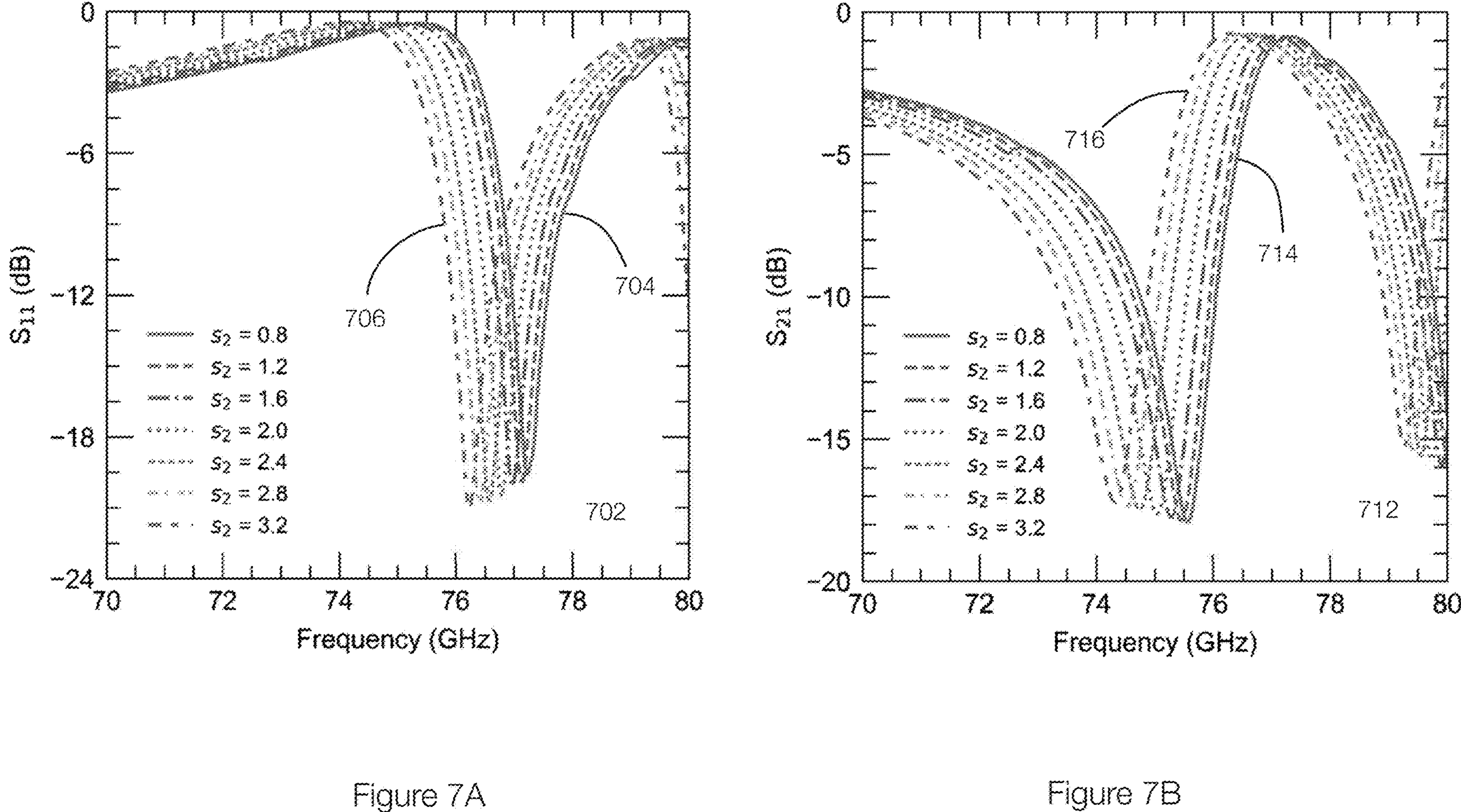
FIG. 7A discloses aspects of the reflection mode.
FIG. 7B discloses aspects of the transmission mode.

FIG. 7A discloses aspects of the reflection mode and FIG. 7B discloses aspects of the transmission mode. More specifically, FIGS. 7A and 7B illustrates aspects of the reflection and the transmission mode of a panel for different configurations of a unit cell. FIGS. 7A and 7B illustrate curves for unit cells that correspond to dimensions $S_2$ (see dimension 212 in FIG. 2) from 0.8 mm to 3.2 mm in increments of 0.4 mm. The curves 704 and 706 in the graph 702 of FIG. 7A correspond, respectively, to dimensions of 0.8 and 3.2 mm. The curves 714 and 716 of FIG. 7B correspond, respectively, to dimensions of 0.8 and 3.2 mm.

When the panel (e.g., the panel 400) is configured to operate in the reflection mode, the unit cell reflects most of the signal as illustrated in the simulated magnitude of $S_{11}$ (dB) at about 77 GHz as illustrated in the graph 702. When the panel is configured to operate in the transmission mode, the simulated $S_{21}$ response illustrated in the graph 712 of FIG. 7B illustrates a maximum transmission at about 77 GHz.

Figure 7C:
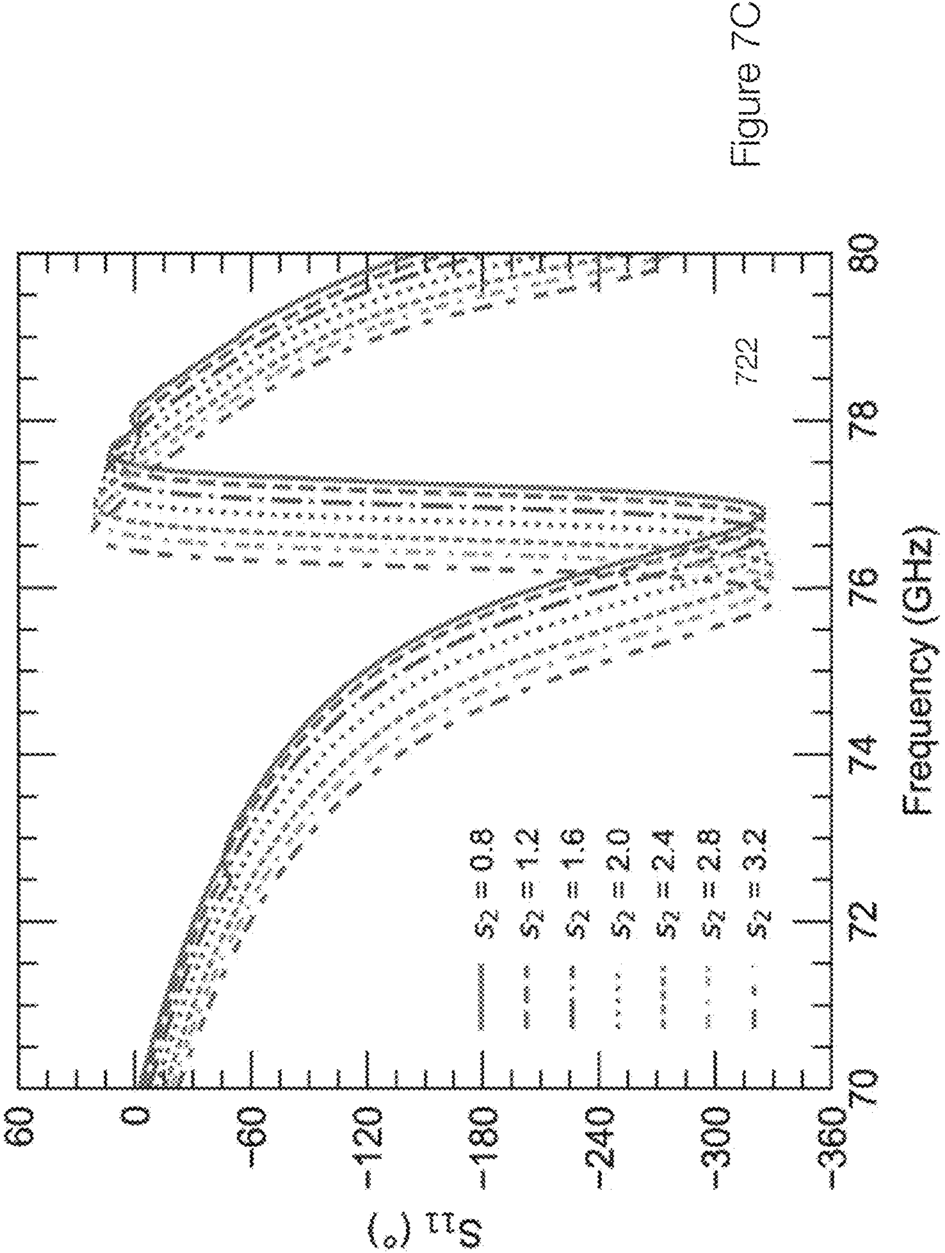
FIG. 7C discloses aspects of a phase response for a panel.

FIG. 7C discloses aspects of a phase response for a panel. The graph 722 in FIG. 7C illustrates a full field electromagnetic simulated variation in the full field EM reflection phase ($S_{11}$ (°)) for a dimensional change (changes in dimensions $S_2$) in the unit cell from 0.8 mm to 3.2 mm.

Embodiments of the invention thus relate to thermally controlling the configuration of a reconfigurable intelligent surface or panel to operate in a transmission or reflection mode. This allows incident signals to be either reflected or transmitted and offers selective access to both sides of the space surrounding the panel. Embodiments of the invention use a meandered heater disposed underneath or in proximity (e.g., separated by an insulator layer) a thin layer of $VO_2$ (or other metal insulator transition material) to increase/decrease the temperature of the $VO_2$ layer. The heater is arranged, in one example, on the periphery of the panel such that the heater pattern does not create any radio frequency interference with the unit cells in the metallization layer in one example.

Embodiments of the invention further eliminate the need for a bulky physical structure, complex feed network, or the tedious task of soldering thousands of components on-chip. The panel, in one example, is a monolithic design with a compact physical profile and a wide operational bandwidth for various frequencies or spectrums including, but not limited to, the mmWave spectrum. As far as our understanding extends, this proposal constitutes the first of its kind monolithic RIS design.

Reconfigurable intelligent surfaces can enhance the coverage area and quality of wireless networks, including in scenarios where obstructions (e.g., trees, buildings, metallic shells (cars)) impede the links between base stations or access points and end users or user equipment. These obstructions might include, by way of example, roadside trees, buildings, walls, or the metallic shells of vehicles.

For example, in outdoor communications, reconfigurable intelligent surfaces can be integrated into windows (e.g., car windows, plane windows, ship windows) to augment the signal strength using the transmission capabilities of reconfigurable intelligent surfaces discussed herein.

Embodiments of the invention also improve indoor-to-outdoor communications as well as indoor communications. In these scenarios, particularly at mmWave and THz frequencies, building walls can cause severe penetration loss, significantly limiting the coverage offered by outdoor base stations. Reconfigurable intelligent surfaces can act as a bridge from outdoor to indoor environments or to enhance coverage in indoor environments.

With indoor communications, more specifically, reconfigurable intelligent surfaces capable of both transmission and reflection are more advantageous than surfaces that only reflect signals and only provide half space coverage. Embodiments of the invention can achieve full-space coverage due to the ability of providing both transmission and reflection capabilities. This could reduce the propagation distance and consequently enhance the received signal power.

Figure 8:
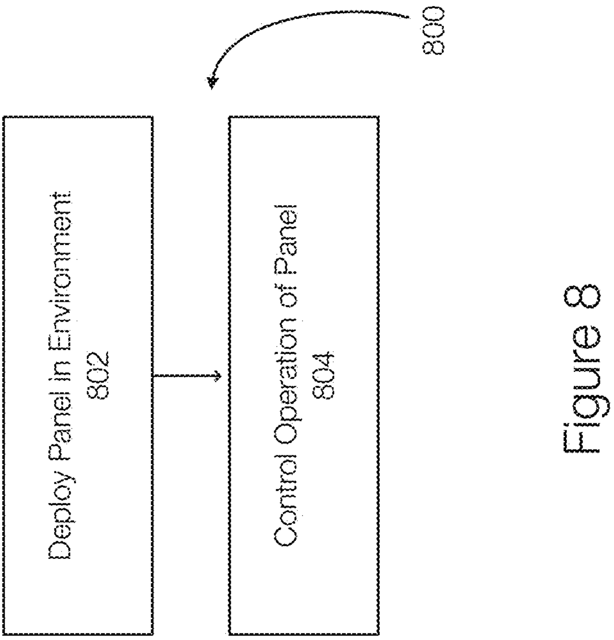
FIG. 8 discloses aspects of controlling an operational mode of a panel.

FIG. 8 discloses aspects of a method for transmitting and/or reflecting signals (e.g., electromagnetic waves). The method 800 includes deploying 802 a panel in an environment. In one example, a panel may include connections such that the panel can be connected to a power source and/or a controller. The controller (e.g., a computing device, server, FPGA) may be local or remote with respect to the panel. The controller then controls 804 operation of the panel. The operation is controlled by placing the panel in a particular mode (e.g., transmission mode or reflection mode). This is achieved by controlling a voltage applied to a refractory heater to generate (or not generate) heat. The heat is transmitted to (or removed from) a switch layer (a metal insulation transition layer such as VO2) that is thermally transitioned. In effect, controlling the voltage applied to the refractory heater allows the switch layer of the panel to transition from the metallic state to the insulator state or from the insulator state to the metallic state. The mode of the panel can be changed by the controller as needed, in response to user input, or for other reasons.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

In general, embodiments of the invention may be implemented in connection with systems, software, and components, that individually and/or collectively implement, and/or cause the implementation of, signal processing operations, wireless coverage operations, signal steering or reflection operations, signal transmission operations, panel control operations, network coverage operations, or the like. More generally, the scope of the invention embraces any operating environment in which the disclosed concepts may be useful.

It is noted that any operation(s) of any of the methods disclosed herein may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A panel comprising: a substrate, a metallization layer formed on a first surface of the substrate, wherein the metallization layer is configured to be resonant at an operating frequency or an operating frequency range, a switch layer formed on a second surface of the substrate, wherein the switch layer is in a metallic state when a temperature of the switch layer is above a transition temperature and is in an insulator state when the temperature of the switch layer is below the transition temperature, and a refractory heater layer configured to generate heat such that the temperature of the switch layer is controlled, wherein the panel operates in a reflective state when the switch layer is in the metallic state and operates in a transmission mode when the switch layer is in the insulator state.

Embodiment 2. The panel of embodiment 1, further comprising an insulator layer positioned between the switch layer and the refractory heater layer, wherein the insulator layer is thermally conductive.

Embodiment 3. The panel of embodiment 1 and/or 2, wherein the metallization layer comprises a plurality of unit cells that are configured to have a phase profile such that the incident signal is reflected in a specific direction when operating in the reflection mode.

Embodiment 4. The panel of embodiment 1, 2, and/or 3, further comprising a cover layer formed over the metallization layer.

Embodiment 5. The panel of embodiment 1, 2, 3, and/or 4, further comprising a bottom cover layer configured to cover the refractory heater layer.

Embodiment 6. The panel of embodiment 1, 2, 3, 4, and/or 5, further comprising contact points extending through the bottom cover layer and connecting with the refractory heater layer, wherein a voltage is applied to the refractory heater layer via the contact points.

Embodiment 7. The panel of embodiment 1, 2, 3, 4, 5, and/or 6, wherein the refractory heater layer is transparent at least to the operating frequency or range of operating frequencies.

Embodiment 8. The panel of embodiment 1, 2, 3, 4, 5, 6, and/or 7, where in the refractory heater layer comprises a strip with a meandering shape.

Embodiment 9. The panel of embodiment 1, 2, 3, 4, 5, 6, 7, and/or 8, wherein at least one of: the strip is disposed at or near a periphery of the panel to reduce radio frequency interference on the metallization layer, the meandering shape comprises transitions such that different portions of the meandering strip are oriented in different orientations, the meandering shape includes curved portions and straight portions, and the strip does not overlap with unit cells of the metallization layer in a depth direction or at least partially overlaps with the unit cells in the depth direction.

Embodiment 10. The panel of embodiment 1, 2, 3, 4, 5, 6, 7, 8, and/or 9, wherein ends of the refractory heater layer terminate at contact points.

Embodiment 11. The panel of embodiment 1, 2, 3, 4, 5, 6, 7, 8, 9, and/or 10, wherein the refractory heater layer comprises tungsten and the switch layer comprises vanadium dioxide (VO2).

Embodiment 12. The panel of embodiment 1, 2, 3, 4, 5, 6, 7, 8, 9, 10, and/or 11, wherein the refractory heater layer has a resistance and wherein a shape of the refractory heater layer is configured to avoid temperature gradients.

Embodiment 13. The panel of embodiment 1, 2, 3, 4, 5, 6, 7, 8, 9, 10, 11, and/or 12, further comprising configuring a shape, width, and thickness of the refractory heater layer.

Embodiment 14. The panel of embodiment 1, 2, 3, 4, 5, 6, 7, 8, 9, 10, 11, 12, and/or 13, further comprising a controller configured to connect and disconnect a power source to the refractory heater layer.

Embodiment 15. The panel of embodiment 1, 2, 3, 4, 5, 6, 7, 8, 9, 10, 11, 12, 13, and/or 14, wherein the controller is controlled wirelessly.

Embodiment 16. The panel of embodiment 1, 2, 3, 4, 5, 6, 7, 8, 9, 10, 11, 12, 13, 14, and/or 15, wherein the substrate comprises at least one of silicon, FR4, glass, sapphire, quartz or a dielectric material and wherein the insulator layer comprises a dielectric material and wherein the panel is transparent to radio frequencies in the transmission mode.

Embodiment 17. A system comprising: panels that are place in an environment to provide network coverage in the environment, wherein each panel comprises: a substrate, a metallization layer formed on a first surface of the substrate, wherein the metallization layer is configured to be resonant at an operating frequency or an operating frequency range, a switch layer formed on a second surface of the substrate, wherein the switch layer is in a metallic state when a temperature of the switch layer is above a transition temperature and is in an insulator state when the temperature of the switch layer is below the transition temperature, and a refractory heater layer configured to generate heat such that the temperature of the switch layer is controlled, wherein the panel operates in a reflective state when the switch layer is in the metallic state and operates in a transmission mode when the switch layer is in the insulator state.

Embodiment 18. The system of embodiment 17, wherein at least one of the panels operates in the reflective mode and at least one of the panels operates in the transmission mode.

Embodiment 19. The system of embodiment 17 and/or 18, wherein a first panel included in the panels is configured to reflect an incident signal to a second panel included in the panels.

Embodiment 20. The system of embodiment 17, 18, and/or 19, wherein each of the panels further comprises: an insulator layer positioned between the switch layer and the refractory heater layer, wherein the insulator layer is thermally conductive, wherein the metallization layer comprises a plurality of unit cells that are configured to have a phase profile such that the incident signal is reflected in a specific direction when operating in the reflection mode, a cover layer formed over the metallization layer, a bottom cover layer formed below the refractory heater layer, and contact points extending through the bottom cover layer and connecting with the refractory heater layer, wherein a voltage is applied to the refractory heater layer via the contact points, wherein: the refractory heater layer is transparent at least to the operating frequency or range of operating frequencies, the refractory heater layer comprises a meandering strip disposed at or near a periphery of the panel to reduce radio frequency interference on the metallization layer, wherein the refractory heater layer comprises tungsten and the switch layer comprises vanadium dioxide (VO2), wherein the refractory heater layer has a resistance and wherein a shape of the refractory heater layer is configured to avoid temperature gradients and heat the switch layer.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, service, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 9:
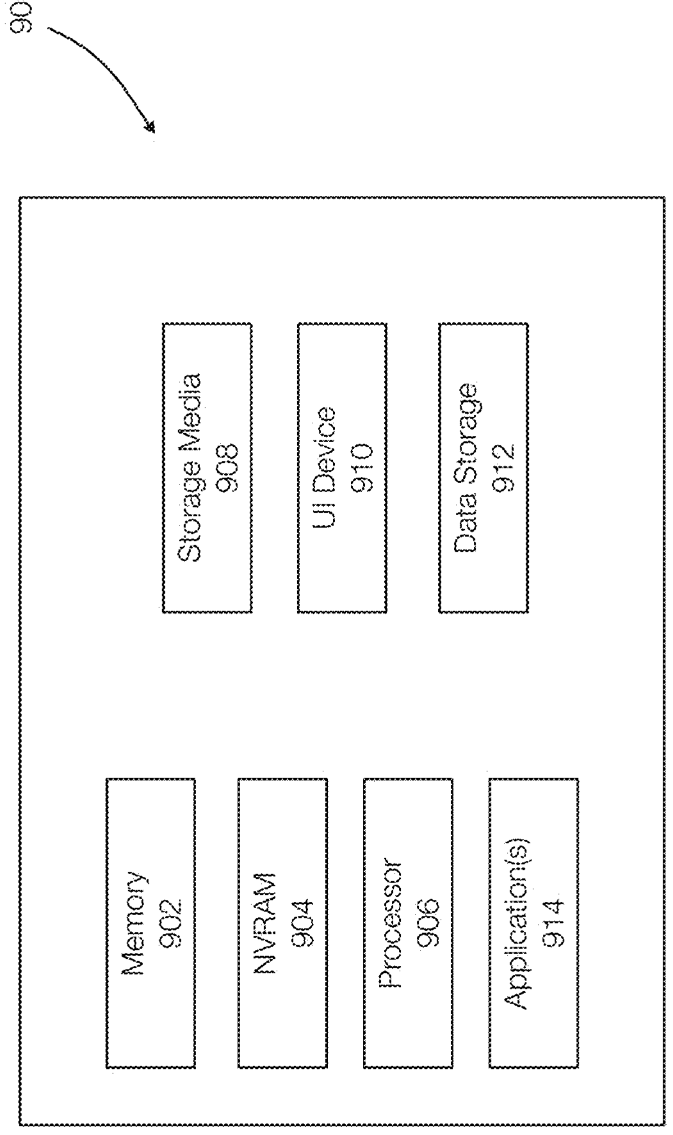
FIG. 9 discloses aspects of a computing device, entity, or system.

With reference briefly now to FIG. 9, any one or more of the entities disclosed, or implied, by the Figures and/or elsewhere herein, may take the form of, or include, or be implemented on, or hosted by, a physical computing device, one example of which is denoted at 900. As well, where any of the aforementioned elements comprise or consist of a virtual machine (VM), that VM may constitute a virtualization of any combination of the physical components disclosed in FIG. 9.

In the example of FIG. 9, the physical computing device 900 includes a memory 902 which may include one, some, or all, of random access memory (RAM), non-volatile memory (NVM) 904 such as NVRAM for example, read-only memory (ROM), and persistent memory, one or more hardware processors 906, non-transitory storage media 908, UI device 910, and data storage 912. One or more of the memory components 902 of the physical computing device 900 may take the form of solid state device (SSD) storage. As well, one or more applications 914 may be provided that comprise instructions executable by one or more hardware processors 906 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A panel comprising:

a substrate;

a metallization layer formed on a first surface of the substrate, wherein the metallization layer is configured to be resonant at an operating frequency or an operating frequency range, the metallization layer including a plurality of unit cells;

a switch layer formed on a second surface of the substrate, wherein the switch layer is in a metallic state when a temperature of the switch layer is above a transition temperature and is in an insulator state when the temperature of the switch layer is below the transition temperature; and a refractory heater layer configured to generate heat such that the temperature of the switch layer is controlled, wherein the panel operates in a reflective mode when the switch layer is in the metallic state and operates in a transmission mode when the switch layer is in the insulator state, an insulator layer positioned between the switch layer and the refractory heater layer, wherein the insulator layer is thermally conductive, wherein the unit cells of the metallization layer are configured to have a phase profile such that an incident signal is reflected in a specific direction when operating in the reflective mode;

a cover layer formed over the metallization layer;

a bottom cover layer formed below the refractory heater layer; and wherein:

the refractory heater layer is transparent at least to the operating frequency or range of operating frequencies, the refractory heater layer comprises a strip having a meandering shape disposed at or near a periphery of the panel to reduce radio frequency interference on the metallization layer, wherein the refractory heater layer has a resistance and wherein a shape of the refractory heater layer is configured to avoid temperature gradients.

2. The panel of claim 1, further comprising contact points extending through the bottom cover layer and connecting with the refractory heater layer, wherein a voltage is applied to the refractory heater layer via the contact points.

3. The panel of claim 1, wherein at least one of:

the meandering shape comprises transitions such that different portions of the strip are oriented in different orientations;

the meandering shape includes curved portions and straight portions; and the strip does not overlap with the unit cells of the metallization layer in a depth direction or at least partially overlaps with the unit cells in the depth direction.

4. The panel of claim 1, wherein ends of the refractory heater layer terminate at contact points.

5. The panel of claim 1, wherein the refractory heater layer comprises tungsten and the switch layer comprises vanadium dioxide ($VO_2$).

6. The panel of claim 1, further comprising configuring a shape, width, and thickness of the refractory heater layer.

7. The panel of claim 1, further comprising a controller configured to connect and disconnect a power source to the refractory heater layer.

8. The panel of claim 7, wherein the controller is controlled wirelessly.

9. The panel of claim 1, wherein the substrate comprises at least one of silicon, FR4, glass, sapphire, quartz or a dielectric material and wherein the insulator layer comprises a dielectric material and wherein the panel is transparent to radio frequencies in the transmission mode.

10. A system comprising:

panels that are placed in an environment to provide network coverage in the environment, wherein each panel comprises:

a substrate;

a metallization layer formed on a first surface of the substrate, wherein the metallization layer is configured to be resonant at an operating frequency or an operating frequency range;

a switch layer formed on a second surface of the substrate, wherein the switch layer is in a metallic state when a temperature of the switch layer is above a transition temperature and is in an insulator state when the temperature of the switch layer is below the transition temperature; and a refractory heater layer configured to generate heat such that the temperature of the switch layer is controlled, wherein the panel operates in a reflective mode when the switch layer is in the metallic state and operates in a transmission mode when the switch layer is in the insulator state, an insulator layer positioned between the switch layer and the refractory heater layer, wherein the insulator layer is thermally conductive, wherein the metallization layer comprises a plurality of unit cells that are configured to have a phase profile such that an incident signal is reflected in a specific direction when operating in the reflective mode;

a cover layer formed over the metallization layer;

a bottom cover layer formed below the refractory heater layer; and wherein:

the refractory heater layer is transparent at least to the operating frequency or range of operating frequencies, the refractory heater layer comprises a meandering strip disposed at or near a periphery of the panel to reduce radio frequency interference on the metallization layer, wherein the refractory heater layer has a resistance and wherein a shape of the refractory heater layer is configured to avoid temperature gradients.

11. The system of claim 10, wherein at least one of the panels operates in the reflective mode and at least one of the panels operates in the transmission mode.

12. The system of claim 10, wherein a first panel included in the panels is configured to reflect an incident signal to a second panel included in the panels.

13. The system of claim 10, wherein each of the panels further comprises:

contact points extending through the bottom cover layer and connecting with the refractory heater layer, wherein a voltage is applied to the refractory heater layer via the contact points, wherein the refractory heater layer comprises tungsten and the switch layer comprises vanadium dioxide ($VO_2$).

* * * * *